Dec. 14, 1965  B. B. BOHRER  3,223,748
MULTI-COMPONENT SEPARATION PROCESS
Filed Aug. 1, 1961
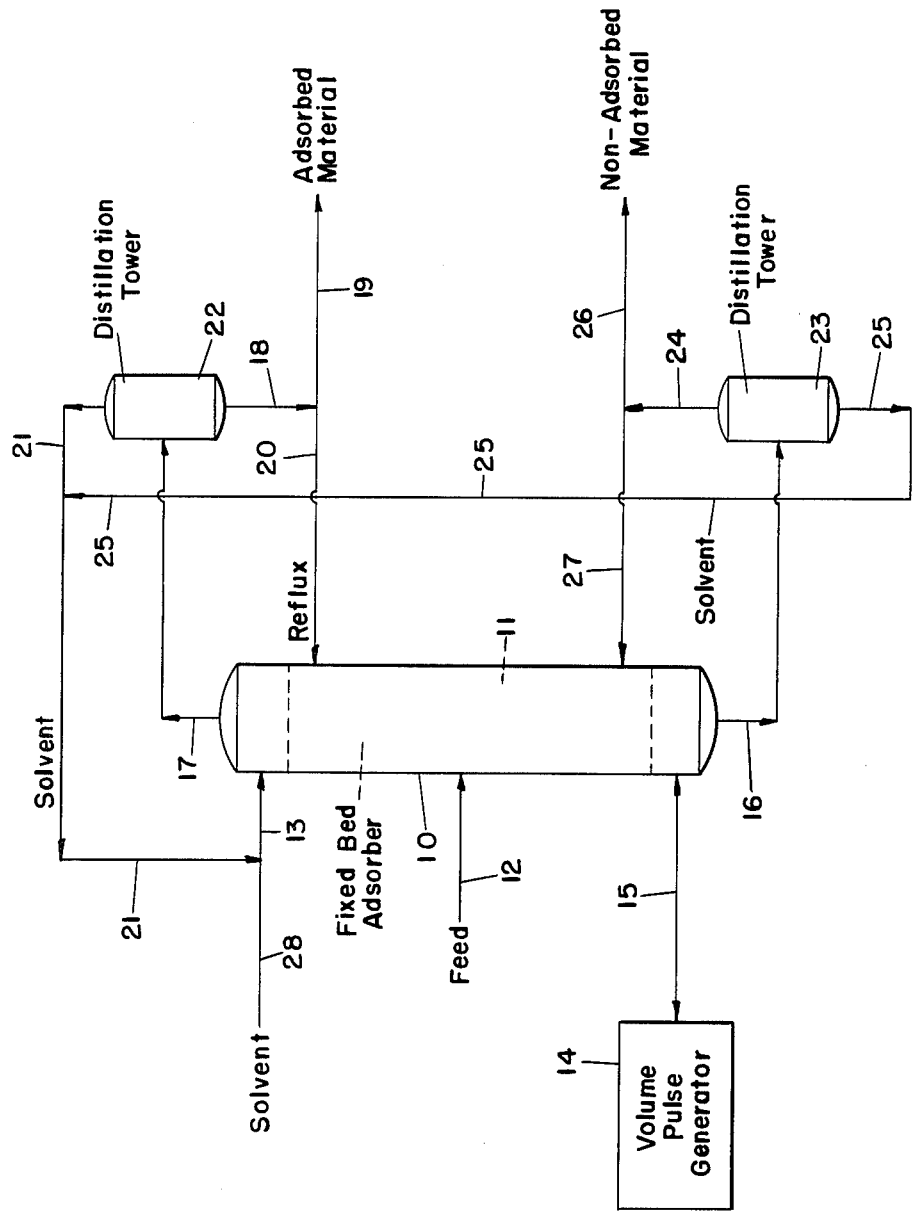
INVENTOR.
BYRON B. BOHRER
BY
Robert O. Spurdle
ATTORNEY United States Patent Office 3,223,748
Patented Dec. 14, 1965

3,223,748
MULTI-COMPONENT SEPARATION PROCESS
Byron B. Bohrer, Chester, Pa., assignor to Sun Oil Company, Philadelphia, Pa., a corporation of New Jersey
Filed Aug. 1, 1961, Ser. No. 128,476
6 Claims. (Cl. 260—674)

The present invention relates to a continuous process for the separation of multi-component liquid mixtures. It particularly relates to a continuous adsorption separation process wherein a fixed foraminous bed of solid absorbent is utilized. It especially relates to a continuous adsorption separation process wherein the liquid phase is subjected to a volume pulse to alternately reverse the directional flow of the liquid phase within the bed.

It is well known in the art that particulate solids such as silica gel, activated charcoal, activated alumina, clays, bauxite, synthetic resins, magnesia, and the like, have the property of selectively adsorbing or taking up particular liquid components, i.e., some components are more readily adsorbed while others are less readily adsorbed. In this manner a separation may be obtained between components of a two-component mixture, or a multi-component mixture may be separated into two fractions of different characteristics or properties according to adsorbability. By using a series of separation stages, three or more different fractions may be separated. These prior art processes usually recover the adsorbed material by using a second liquid, sometimes called a solvent, for which the solid adsorbent has less affinity than the component which it has absorbed. However, depending on the particular system, the use of a second liquid for which the adsorbent has more affinity than the adsorbed component is also satisfactory. Still further, the adsorbed component or components can be desorbed or removed by vaporization from the adsorbent such as by treating the adsorbent with high temperature steam, hot gases, or by burning off the adsorbed material. Each of the above-mentioned methods are characterized by the attempt to recover or remove the adsorbed material, thus reactivating the adsorbent.

In addition, these basic prior art processes are usually batch operations where the feed material is switched from one battery of adsorbent cases to another in cyclic fashion in order to achieve the benefits of continuous operation. Lately, however, the batch procedure has been turned into continuous operation by use of the moving and/or fluidized bed technique such as described in United States Patent No. 2,582,415. In such a process the solid adsorbent in particulate form is passed downwardly in the form of a compact bed or columnar mass in contact with the liquid material which is being treated. The liquid feed is introduced at an intermediate point in the column of adsorbent; and the unadsorbed components are removed, usually from the top. The adsorbed component or components is separated from the solid either in the same column or in a separate column. However, in either case the absorbent is then passed to another column where it is conditioned for re-use in the process, i.e., the adsorbent must be stripped of contaminants, etc.

It is noted from the above description that, generally speaking, the prior art processes are complex arrangements of vessels and transfer equipment involving considerable expense in construction and maintenance and also involving a considerable amount of "know-how" or process technique in order to optimize operation. This appears true whether the process is batch, e.g., fixed bed operation, or moving bed process.

The present invention is a simplified adsorption separation process involving the premise of separating two fractions by selective adsorption of a component or components of a liquid feed mixture using an adsorbent which has a stronger affinity for one of the fractions than for the other. Preferably the solvent is more adsorbable or of the same order or adsorbability as the feed components. Characteristically, the present invention is continuous and uses, basically a single fixed bed of adsorbent.

The object of the present invention is to provide an adsorption separation process which is simple and inexpensive, which effects the separation continuously using a fixed bed of adsorbent, and which re-uses the solvent.

The invention may be more fully understood by reference to the accompanying figure which is a schematic flow diagram of one embodiment of the process.

According to my invention, a multi-component feed mixture is fed in liquid phase into an adsorption zone containing a fixed foraminous bed of solid adsorbent selective for adsorbing at least one component at a point intermediate the ends of said bed. A liquid solvent is fed into the adsorption zone at a point adjacent an end of the bed. Then, a volume pulse is imposed on the adsorption zone to alternately reverse the directional flow of the liquid phase within the bed, thereby moving the selectively adsorbed component toward one end of the zone. The adsorbed component is removed from one end of the zone and the non-adsorbed component is removed from the other end of the zone. Solvent is recovered from both components such as by distillation and is preferably recycled to the process.

In the accompanying drawing, a vertical elongated shell or column 10 is provided as a container or housing for suitable adsorbent 11. The adsorbent is preferably in granular form, e.g., particles of 3 to 60 mesh, and, when placed in column 10, forms a fixed foraminous bed. Volume pulse generator 14 is connected to the adsorber by means of line 15. Distillation towers 22 and 23 are provided as means for recovering the solvent for each product component. In the drawing, the volume pulse generator 14 is positioned at the bottom end of the adsorber. It is to be understood, however, that generator 14 may be placed at either end of the adsorber.

As used herein, the volume pulse generator can be of any type known to the art. Conventionally, the volume generator is a long-stroke piston arrangement such that the stroke of the piston moves the entire body of liquid within the adsorbent bed a finite distance which must be less than the length of the adsorption zone. Usually the volume of liquid moved is 0.1 to 0.5 times the volume of the adsorption zone. The piston is driven by any suitable power source (not shown) such as an electric motor, gas turbine, reciprocating engine, or the like.

The frequency of pulsation may vary from 10 to 500 pulses per minute with the preferred rate between 100 and 200 pulses per minute. If the frequency is too high, the surge of liquid may cause the entire bed of adsorbent to lift in the chamber.

As illustrative of a specific embodiment of the operation of the pulsating adsorber, a multi-component mixture, which it is desired to separate into at least two components such as a mixture of toluene and hexane in approximately a 1 to 1 volume ratio, is charged through line 12 into column 10 which is filled with 6–14 mesh activated charcoal. The adsorption system is maintained at about room temperature and atmospheric pressure. However, superatmospheric or subatmospheric pressure may be desirable in some cases. Furthermore, in general, the upper limit on temperature is the boiling point of the feed at the operating pressure with the lower temperature limit being the freezing or solidification point of the feed.

Preferably the operating temperature should be as close to the freezing point of the feed liquid as is practical. Those skilled in the art are familiar with such requirement.

Benzene, as the solvent, is charged into the adsorber 10 via line 13 in an amount approximately 5–20 times, e.g., 15 times, the feed rate on a volume basis. Benzene is more adsorbable on activated charcoal than the toluene. When the adsorber 10 is filled with the charge mixture and solvent, the volume pulse generator 14 is started. The piston stroke is set for 0.3 times the volume of adsorbent.

Since the benzene is more readily adsorbed than the toluene and the hexane is not significantly adsorbed at all, the pores of the charcoal are filled primarily with benzene. In this manner the charcoal has been made extremely concentration sensitive. Accordingly, on the upstroke, the liquid phase comprising primarily benzene moves into the column through line 15, up through the column, and out line 17 into distillation tower 22. This action moves the toluene up the column from the feed point wherein it is adsorbed on the few remaining sites of the charcoal. Since the piston stroke is less than the volume of the bed, initially only benzene flows out of the adsorption zone through line 17. On the uppermost stroke of the pulse, an equilibrium-concentration relationship of benzene and toluene is established on the surface of the charcoal.

On the downstroke, liquid moves into the generator 14 via line 15 and down the column. This action moves the benzene solvent down the column, thereby desorbing the adsorbed toluene in the process. However, since the concentration of toluene is increasing along the downward path of the flow, less and less toluene is desorbed. accordingly, the toluene is not displaced down the column as far as it is adsorbed. Now, the pulse is repeated; and the toluene again moves up the column but for a distance slightly further than on the preceding stroke, since the concentration of toluene slightly increases at each point. Therefore, by operating in this stepwise fashion, the toluene, admixed with benzene, ultimately passes through line 17 into fractionator 22. Pure toluene is removed via line 18 and recovered through line 19. If desired, a portion of toluene can be recycled via line 20 as reflux on adsorber 10. Benzene is removed from distillation tower 22 via line 21 and returned to adsorber 10 for re-use via line 13. Make-up benzene is added as needed through line 28.

Benzene and non-adsorbed hexane leave the other end of the adsorption zone via line 16 and pass into distillation tower 23. Pure benzene is removed from tower 23 through line 25 and is admixed with other benzene in line 21 for re-use in adsorber 10.

The non-adsorbed hexane is removed via line 24 from distillation tower 23 and recovered as product through line 26. As desired, a portion of the hexane is returned to adsorber 11 as reflux via line 27.

While the hereinabove-described specific embodiment applied to the separation of toluene from hexane using a benzene solvent, it is to be understood that the process is suitable for other separation-by-adsorption applications. The invention is particularly suitable for adsorption processes whch normally require the use of a highly active adsorbent since the pulsating tecnique would allow the use of a mildly active adsorbent, thus effecting economies in such processes.

Actually the invention may be adapted to the separation of any liquid mixture amenable to separation by preferential adsorption. By way of illustration, suitable feed stocks to the inventive process include kerosene distillates which may be dearomatized and desulfurized to produce a superior grade stock, diesel fuel which may be dearomatized to produce a high cetane number product, lubricating oils which may be dearomatized and deasphaltized to give a high quality oil, aromatic-paraffinic mixtures, olefin-paraffinic mixtures, aromatic-aromatic mixtures such as separating alkyl benzenes from, say, naphthalene, and the like. The invention is particularly suitable for various chromatographic separations. Further, catalytically-reformed naphtha may be separated into an aromatic adsorbate and a non-aromatic percolate; and cracked naphtha may be processed to separate aromatic, olefinic, and paraffinic fractions. Other illustrations include the reaction products of the Fischer-Tropsch synthesis and of the Oxo process containing substantial amounts of oxygenated organic compounds which may be separated into an oxygenated compound fraction and a hydrocarbon fraction.

The type of solvent used in this process will vary with the type of feed stock being treated and the degree of separation desired. In each case, the solvent should have a high diffusion coefficient, i.e., more readily adsorbed than the adsorbate, and should be readily separable from the adsorbate and from the percolate in secondary recovery operations. It is preferred that the solvent be mutually soluble in the absorbate. Mutual solubility is not essential, however; and a reasonable solubility of solvent in adsorbate is often sufficient.

I claim:
1. A continuous adsorption process for separating a mixture of miscible organic liquids into two separate fractions which comprises
  (a) continuously feeding a multicomponent mixture of miscible organic liquids into an adsorption zone containing a fixed foraminous bed of solid adsorbent selective for adsorbing one fraction of said mixture,
  (b) feeding a liquid organic solvent through said adsorption zone, said solvent being more adsorbable on the adsorbent than any of the fractions of the mixture to be separated, said solvent selectively moving the unadsorbed fraction of said mixture to one end of said adsorption zone,
  (c) imposing a cyclic volume pulse on the adsorption zone to alternately reverse the directional flow of the liquid phase within said adsorption zone and thereby selectively move the adsorbed fraction in the direction countercurrent to that of the unadsorbed fraction,
  (d) removing solvent and the unadsorbed fraction from one end of the adsorption zone, and
  (e) removing solvent and the adsorbed fraction from the opposite end of said adsorption zone.

2. Process according to claim 1 wherein said volume pulse is at a rate of from 10 to 500 pulses per minute.

3. Process according to claim 2 wherein said multicomponent mixture comprises mainly aromatic and paraffinic hydrocarbons.

4. Process according to claim 3 wherein said adsorbent is activated carbon.

5. Process according to claim 1 wherein said volume pulse is at a rate below that rate which will cause any movement of the bed.

6. Process according to claim 2 wherein said rate is below that rate which will cause any movement of the bed.

References Cited by the Examiner
UNITED STATES PATENTS 2,709,643   5/1955   Peery _____ 210—19
2,808,318   10/1957  Feick _____ 259—1

FOREIGN PATENTS 205,583   1/1957   Australia.

PAUL M. COUGHLAN, *Primary Examiner.*

ALPHONSO D. SULLIVAN, *Examiner.*